(12) United States Patent
Schweid

(10) Patent No.: US 6,333,498 B1
(45) Date of Patent: Dec. 25, 2001

(54) REDUCTION OF INTEGRATING CAVITY EFFECT IN SCANNERS USING POLARIZING FILTERS

(75) Inventor: Stuart A. Schweid, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/447,825

(22) Filed: Nov. 23, 1999

(51) Int. Cl.[7] .................................................. H01L 27/00
(52) U.S. Cl. ........................ 250/208.1; 250/235; 250/225
(58) Field of Search .................................. 250/208.1, 234, 250/235, 237 R, 566, 556, 559.4, 216, 225; 358/474, 475, 483, 486; 359/210–216

(56) References Cited

U.S. PATENT DOCUMENTS

| 4,595,259 | * | 6/1986 | Perregaux | 359/221 |
| 5,847,846 | * | 12/1998 | Wu et al. | 358/475 |

* cited by examiner

Primary Examiner—Que T. Le
(74) Attorney, Agent, or Firm—Oliff & Berridge PLC

(57) ABSTRACT

The integrating cavity effect is reduced by using a polarizing filter. The polarizing filter reduces the secondary illumination onto a document being scanned. The filter is placed at the opening to the cavity of the scanner. The sum effects of using a polarizing filter reduces the integrating cavity effect by a factor of 2.

22 Claims, 1 Drawing Sheet

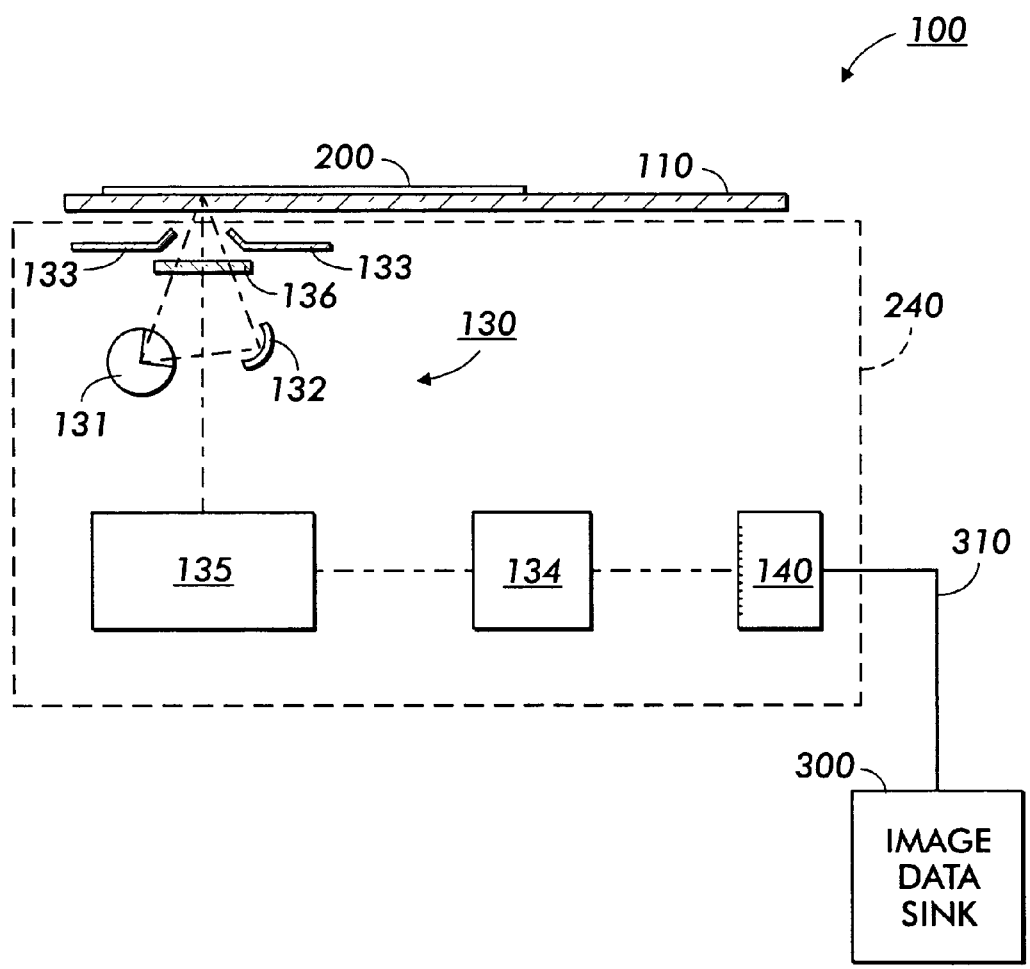
THE FIGURE

REDUCTION OF INTEGRATING CAVITY EFFECT IN SCANNERS USING POLARIZING FILTERS

BACKGROUND OF THE INVENTION

1. Field of Invention

This invention is directed towards reducing the integrating cavity effect.

2. Description of the Related Art

Scanners and other image capture devices read information from an original image to generate electronic data representing the scanned original image. A typical image capturing device includes an illumination system including a light source and an array of photosensitive elements, and may include mirrors and/or lenses. The photosensitive elements produce electrical signals in proportion to the amount of light to which each photosensitive element has been exposed. The mirrors and lenses, if included, usually are mounted in a cavity between an imaging surface on which the original image sits and a surface on which the light source and the photosensitive elements are mounted. The original image is placed on the imaging surface. The light source is aimed at the original image. The light reflects off the original image back into the cavity toward the photosensitive elements, where the intensity of the reflected light is measured.

SUMMARY OF THE INVENTION

In many scanner systems, the generated image data is affected by variable illumination intensity arising from the integrating cavity effect. The integrating cavity effect describes the secondary illumination of a pixel of the original image being measured due to multiple reflections that illuminate that pixel. That is, when scanning a document, light is projected onto the document and the light is reflected off the document into an illumination cavity, where the intensity of the light is measured for each individual pixel. A secondary illumination also occurs which alters the accuracy of the measurement. This secondary illumination is a function of the image surrounding the pixel being measured. Light reflecting off the surrounding pixels enters back into the cavity and then is reflected back onto the document and the pixel being measured. The lighter the surrounding image of a given pixel, the more light that is reflected back into the cavity and onto the document. This is referred to as the integrating cavity effect.

Techniques exist that can partially correct for the integrating cavity effect. These techniques determine the point reflectivity by measuring both the point intensity and a local average of the image intensity. Using both these values, the point reflectivity is calculated. However, these techniques can be costly and require large amounts of processing resources.

This invention provides systems and methods that optically reduce the integrating cavity effect and do not require any measuring or processing resources.

This invention separately provides an image capture device that includes a polarizing filter that optically reduces the integrating cavity effect.

In various exemplary embodiments of the systems and methods according to this invention, a polarizing filter is placed over the opening to the cavity to reduce the integrating cavity effect. This reduces the amount of light that is reflected back onto the image being captured. The light that is reflected off the document is sufficiently randomized that only a fraction of the reflected light will be able to pass through the polarizing filter. Therefore, the amount of light that re-enters the cavity is diminished. Accordingly, the light that is reflected back onto the image, causing a secondary illumination of the image, is reduced. The overall effect of the polarizing filter reduces the integrating cavity effect by at least a factor of 2.

These and other features and advantages of this invention are describes in or are apparent from the following detailed description of the apparatus/systems and methods according to this invention.

BRIEF DESCRIPTION OF THE DRAWINGS

Various exemplary embodiments of this invention will be described in detail, with reference to the following figures, wherein:

The FIGURE illustrates an image capture device according to this invention.

DETAILED DESCRIPTION OF PREFERRED EMBODIMENTS

The FIGURE shows an image capture device scanner 100 that includes one or more photosensitive arrays 140 and a scanning system assembly 130, that may move together as a single unit along the scanning path or may be stationary. The photosensitive arrays 140 may include sensors (not shown), such as CCDs or photodiodes, that are controlled to sense light reflected from an original array during an illumination period. The photosensitive sensors develop a charge indicative of the amount of light detected. The scanning system assembly 130 includes several optical components, including a light source 131, a reflector 132, and a baffle 133. The light source 131 illuminates the original image 200. The light source 131 can be any light emitting element that emits light at a sufficiently high intensity, such as a fluorescent lamp. The reflector 132 and the baffle 133 are used to help direct the light onto a small area of the platen 110. The reflector 132 reflects the light onto a certain point through the baffle 133. The baffle 133 has a small opening that only allows a small amount of light to pass through it and onto the original image 200. The scanning system assembly 130 may also include a polarizing filter 136 and may include a lens 134 and one or more mirrors 135. The lens 134 and mirrors 135 help focus the light reflected off an original image 200 onto the photosensitive array 140. The entire scanning system assembly 130 is located in a cavity 240, formed between the platen 110 and the photosensitive array 140.

The polarizing filter 136 continues to polarize any light that is reflected back towards the original image 200. The sum effect of the polarizing filter 136 reduces the integrating cavity effect by at least a factor of 2 each time the light passes to and from the original image 200 though the polarizing filter 136. Depending on the smoothness of the reflector 132, the integrating cavity effect can be reduced even more. This reduction in the integrating cavity effect allows for more accurate measurement of the individual pixels in the original image 200.

Using the polarizing filter 136 provides an effective and inexpensive way to reduce the integrating cavity effect. The polarizing filter 136 is easily implemented and obviates the need for correction of the generated image data using electronic image processing, which is expensive and requires either more space, if implemented in hardware, and/or more processing resources, if implemented as software or firmware.

During operation of a typical image capture device, the original image 200 to be captured is placed on the platen 110. The light source 131 is driven to emit light. The light from the light source 131 is directed by the reflector 132 through the polarizing filter 136 towards the original image 200 through the baffle 133. The light is then reflected back from the original image 200 through the polarizing filter 136 towards the lens 134 through the mirrors 135. The lens 134 focuses the light before it reaches the photosensitive array 140. The image signals generated by the photosensitive array 140 are then output to an image data sink 300 over a link 310.

While the FIGURE shows the image capture device 100 as a separate device from the image data sink 300, the image capture device 100 may be an integrated device, such as a digital copier, computer with a built-in printer, or any other integrated device that is capable of producing a hard copy image output. With such a configuration, for example the image capture device 100 and the data sink 300 may be contained within a single device. Alternatively, the image capture device 100 may be a separate device attachable upstream of a stand alone image data sink 300. For example, the image capture device 100 may be a device which interfaces with the image data sink.

In general, the image capture device 100 can be any one of a number of different sources, such as a scanner, a digital copier, or a facsimile device that is suitable for generating electronic image data. Thus, the image capture device 100 can be any known or later developed device that is capable of generating image data by illuminating an original image. In general, the image data sink 300 can be any device that is capable of outputting or storing the processed image data generated according to the systems and methods of this invention, such as a printer, a copier or other image forming devices, a facsimile device, a display device, a memory, or the like. The link 310 can be any known or later developed device or system for connecting the image capture device 100 to the image data sink 300, including a direct cable connection, a connection over a wide area network or a local area network, a connection over an intranet, a connection over the Internet, or a connection over any other distributed processing network or system. In general the link 310 can be any known or later developed connection system or structure usable to connect the image capture device 100 to the image data sink 300.

While this invention has been described in conjunction with the exemplary embodiments outlined above, it is evident that many alternatives, modifications and variations will be apparent to those skilled in the art. Accordingly, the exemplary embodiments of the invention may be made without departing from the spirit and scope of the invention.

What is claimed is:

1. An image capture device that generates electronic image data from an original image, comprising:
   a transparent platen, the original image placeable on the transparent platen;
   a light source;
   an imaging device;
   a reflector, distinct from the light source, illuminated by the light source, light reflected by the reflector illuminating the transparent platen; and
   a polarizer, placed between the transparent platen and the reflector relative to an opening to a cavity of the image capture device, the polarizer independently reducing the amount of light reflected and transmitted to the imaging device.

2. The image capture device of claim 1, further comprising one or more mirrors and at least one lens that are placed between the polarizer and the imaging device.

3. The image capture device of claim 2, wherein the imaging device is at least one of a CCD array and an array of photodiodes.

4. The image capture device of claim 1, further including a baffle, wherein the baffle is positioned below the transparent platen.

5. The image capture device of claim 4, further including a cavity, wherein the baffle provides an opening from the transparent platen to the cavity.

6. The image capture device of claim 5, wherein the polarizer covers the opening to the cavity.

7. The image capture device of claim 1, further including a reflector.

8. The image capture device of claim 7, wherein the reflector has various levels of smoothness.

9. The image capture device of claim 8, wherein light reflecting from the reflector is depolarized based on the smoothness of the reflector.

10. The image capture device of claim 1, wherein the polarizer is a single polarizer.

11. An image capture device that generates an electronic image data from an original image, comprising:
    a transparent platen, the original image placeable on the transparent platen;
    a light source;
    an imaging device;
    a member placed between the light source and the transparent platen, the member having an opening through which light from the light source passes to illuminate the original image and through which the light reflected from the original image passes to illuminate the imaging device; and
    a polarizer, placed over the opening in the member, the polarizer independently reducing the amount of light reflected and transmitted to the imaging device.

12. The image capture device of claim 4, further comprising one or more mirrors and at least one lens that are placed between the polarizer and the imaging device.

13. The image capture device of claim 4, wherein the polarizer is a single polarizer.

14. The image capture device of claim 11, further comprising one or more mirrors and at least one lens that are placed between the polarizer and the imaging device.

15. The image capture device of claim 14, wherein the imaging device is at least one of a CCD array and an array of photodiodes.

16. The image capture device of claim 11, further including a baffle, wherein the baffle is positioned below the transparent platen.

17. The image capture device of claim 16, further including a cavity, wherein the baffle provides an opening from the transparent platen to the cavity.

18. The image capture device of claim 17, wherein the polarizer covers the opening to the cavity.

19. The image capture device of claim 11, further including a reflector.

20. The image capture device of claim 19, wherein the reflector has various levels of smoothness.

21. The image capture device of claim 20, wherein the light reflecting from the reflector is depolarized based on the smoothness of the reflector.

22. The image capture device of claim 11, wherein the polarizer is a single polarizer.

* * * * *